(12) United States Patent
Teng et al.

(10) Patent No.: US 9,826,476 B2
(45) Date of Patent: Nov. 21, 2017

(54) METHOD AND APPARATUS FOR ACTIVATING AN INACTIVE CELL

(71) Applicant: Nokia Solutions and Networks Oy, Espoo (FI)

(72) Inventors: Yong Teng, Beijing (CN); Kari Veikko Horneman, Oulu (FI); Qiaoling Yu, Shanghai (CN); Jiang Wang, Shanghai (CN); Yuanping Zhu, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/103,018

(22) PCT Filed: Dec. 18, 2013

(86) PCT No.: PCT/CN2013/089869
§ 371 (c)(1),
(2) Date: Jun. 9, 2016

(87) PCT Pub. No.: WO2015/089774
PCT Pub. Date: Jun. 25, 2015

(65) Prior Publication Data
US 2016/0316427 A1 Oct. 27, 2016

(51) Int. Cl.
*H04W 28/02* (2009.01)
*H04W 52/02* (2009.01)
*H04W 72/04* (2009.01)

(52) U.S. Cl.
CPC ... *H04W 52/0206* (2013.01); *H04W 28/0205* (2013.01); *H04W 72/0426* (2013.01); *Y02B 60/50* (2013.01)

(58) Field of Classification Search
CPC ......... H04W 52/0206; H04W 72/0426; H04W 28/0205; H04W 52/02; H04W 28/02; H04W 72/04; H04W 16/00; H04W 16/08; H04W 16/14; H04W 16/10; H04W 16/04; H04W 16/06; H04W 40/005; H04W 28/08; H04W 36/0061; H04W 28/10; H04W 28/20; H04W 4/02; H04W 36/0066; H04W 36/0077; Y02B 60/50; H02B 60/50
See application file for complete search history.

(56) References Cited

U.S. PATENT DOCUMENTS 9,148,838 B2 *   9/2015   Yanover ................ H04W 36/22
9,301,250 B2 *   3/2016   Zou .................... H04W 52/0206
(Continued)

FOREIGN PATENT DOCUMENTS

CN      101080046      11/2007
CN      102883408      1/2013

OTHER PUBLICATIONS

International Search Report and Written Opinion received for corresponding Patent Cooperation Treaty Application No. PCT/CN2013/089869, dated Sep. 24, 2014, 14 pages.

*Primary Examiner* — Meless Zewdu
(74) *Attorney, Agent, or Firm* — Harrington & Smith (57) ABSTRACT

A method comprises determining in a base station of a first cell of a first network that there is an inactive second cell of a second, different network which is a candidate cell for a user equipment and causing an activation message to be sent to cause the activation of said inactive second cell.

21 Claims, 6 Drawing Sheets

(56) References Cited

U.S. PATENT DOCUMENTS

| | | | | |
|---|---|---|---|---|
| 2010/0056184 A1* | 3/2010 | Vakil | H04W 4/02 | 455/456.5 |
| 2011/0128862 A1* | 6/2011 | Kallin | H04W 36/22 | 370/245 |
| 2012/0106423 A1* | 5/2012 | Nylander | H04W 52/0241 | 370/311 |
| 2013/0252660 A1* | 9/2013 | Bach | H04W 52/0206 | 455/525 |
| 2013/0286919 A1* | 10/2013 | Kawashima | H04W 52/0206 | 370/311 |
| 2013/0295948 A1* | 11/2013 | Ye | H04W 72/0453 | 455/452.1 |
| 2014/0016615 A1* | 1/2014 | Nanri | H04W 52/0206 | 370/331 |
| 2014/0043966 A1* | 2/2014 | Lee | H04W 28/08 | 370/230 |
| 2014/0073317 A1* | 3/2014 | Zhou | H04W 28/0205 | 455/424 |
| 2014/0086127 A1* | 3/2014 | Kim | H04L 5/001 | 370/311 |
| 2014/0134993 A1* | 5/2014 | Kwak | H04W 52/0206 | 455/418 |
| 2014/0220993 A1* | 8/2014 | Cordeiro | H04W 16/14 | 455/452.1 |
| 2014/0269632 A1* | 9/2014 | Blankenship | H04W 76/025 | 370/336 |
| 2014/0302856 A1* | 10/2014 | Nory | H04W 48/10 | 455/437 |
| 2014/0328182 A1* | 11/2014 | Gao | H04W 28/08 | 370/236 |
| 2015/0119047 A1* | 4/2015 | Macias | H04W 52/0206 | 455/444 |
| 2015/0126206 A1* | 5/2015 | Krishnamurthy | H04W 56/00 | 455/452.1 |
| 2015/0146594 A1* | 5/2015 | Grayson | H04W 52/0206 | 370/311 |
| 2015/0215852 A1* | 7/2015 | Gou | H04W 48/16 | 455/434 |
| 2015/0245270 A1* | 8/2015 | Wu | H04W 36/22 | 370/331 |
| 2015/0327259 A1* | 11/2015 | Murakami | H04W 52/0206 | 370/230 |
| 2015/0341838 A1* | 11/2015 | Pinheiro | H04W 52/0251 | 455/449 |
| 2015/0373611 A1* | 12/2015 | Liu | H04W 36/0083 | 455/436 |
| 2016/0037405 A1* | 2/2016 | Choi | H04W 16/32 | 455/444 |
| 2016/0345194 A1* | 11/2016 | Agyapong | H04W 24/10 | |

* cited by examiner

METHOD AND APPARATUS FOR ACTIVATING AN INACTIVE CELL

RELATED APPLICATION

This application was originally filed as PCT Application No. PCT/CN2013/089869 filed Dec. 18, 2013.

TECHNICAL FIELD

Some embodiments relate to a method and apparatus and in particular but not exclusively to a method and apparatus which for example permits the sharing of resources between operators.

BACKGROUND

A communication system can be seen as a facility that enables communication sessions between two or more nodes such as fixed or mobile communication devices, access points such as base stations, servers, machine type servers, routers, and so on. A communication system and compatible communicating devices typically operate in accordance with a given standard or specification which sets out what the various entities associated with the system are permitted to do and how that should be achieved. For example, the standards, specifications and related protocols can define the manner how communication devices shall communicate with the access points, how various aspects of the communications shall be implemented and how the devices and functionalities thereof shall be configured.

A user can access the communication system by means of an appropriate communication device. A communication device of a user is often referred to as user equipment (UE) or terminal.

Signals can be carried on wired or wireless carriers. Examples of wireless systems include public land mobile networks (PLMN), satellite based communication systems and different wireless local networks, for example wireless local area networks (WLAN). Wireless systems can be divided into coverage areas referred to as cells, such systems being often referred to as cellular systems. A cell can be provided by a base station, there being various different types of base stations. Different types of cells can provide different features. For example, cells can have different shapes, sizes, functionalities and other characteristics. A cell is typically controlled by a control node.

A communication device is provided with an appropriate signal receiving and transmitting arrangement for enabling communications with other parties. In wireless systems a communication device provides a transceiver station that can communicate with another communication device such as e.g. a base station and/or another user equipment. A communication device such as a user equipment (UE) may access a carrier provided by a base station, and transmit and/or receive on the carrier.

An example of cellular communication systems is an architecture that is being standardized by the 3rd Generation Partnership Project (3GPP). A recent development in this field is often referred to as the long-term evolution (LTE) of the Universal Mobile Telecommunications System (UMTS) radio-access technology. In LTE base stations providing the cells are commonly referred to as enhanced NodeBs (eNB). An eNB can provide coverage for an entire cell or similar radio service area.

Cells can provide different service areas. For example, some cells may provide wide coverage areas while some other cells provide smaller coverage areas. The smaller radio coverage areas can be located wholly or partially within a larger radio coverage area. For example, in LTE a node providing a relatively wide coverage area is referred to as a macro eNode B. Examples of nodes providing smaller cells, or local radio service areas, include femto nodes such as Home eNBs (HeNB), pico nodes such as pico eNodeBs (pico-eNB) and remote radio heads.

SUMMARY

According to an aspect, there is provided a method comprising: determining in a base station of a first cell of a first network that there is an inactive second cell of a second, different network which is a candidate cell for a user equipment; and causing an activation message to be sent to cause the activation of said inactive second cell.

The first cell may comprise a larger cell.

The second cell may comprise a smaller cell.

The determining may comprise determining from neighbour information that there is said inactive second cell.

The neighbour information may comprise previous information associated with said inactive second cell.

The neighbour information may comprise information about at least one cell of the first network and at least one cell of the second network.

The neighbour information may be provided in a neighbour relation table.

The method may comprise receiving first information from said user equipment.

The first information from said user equipment may comprise at least one of operator information, network information, cell identity information, received signal strength information and reference signal received power.

The activation message may comprise at least one wake up indicator, cell identity information for said second cell, and frequency information.

The method may comprise receiving second information from said user equipment after said inactive second cell has been activated.

The second information may comprise information indicating if said user equipment is in a coverage area of said second cell.

The method may comprise determining if said user equipment is to be offloaded to said second cell in dependence on said second information from the user equipment after said second cell has been activated.

The method may comprise causing an offload message to be sent to cause said user equipment to be offloaded, if said user equipment is to be offloaded.

The offload message may comprise one or more of information identifying the operator, information identifying said smaller cell, information identifying said user equipment, traffic information and signal strength information.

The causing a message to be sent may comprise causing said message to be sent to a spectrum controlling entity of said first network.

The first network and said second network may be provided by different network operators.

According to another aspect, there is provided an apparatus in a base station of a first cell in a first network, said apparatus comprising: means for determining that there is an inactive second cell of a second, different network which is a candidate cell for a user equipment; and means for causing an activation message to be sent to cause the activation of said inactive second cell.

The first cell may comprise a larger cell.

The second cell may comprise a smaller cell.

The means for determining may determine from neighbour information that there is said inactive second cell.

The neighbour information may comprise previous information associated with said inactive second cell.

The neighbour information may comprise information about at least one cell of the first network and at least one cell of the second network.

The neighbour information may be provided in a neighbour relation table.

The apparatus may comprise means for receiving first information from said user equipment.

The first information from said user equipment may comprise at least one of operator information, network information, cell identity information, received signal strength information and reference signal received power.

The activation message may comprise at least one wake up indicator, cell identity information for said second cell, and frequency information.

The apparatus may comprise means for receiving second information from said user equipment after said inactive second cell has been activated.

The second information may comprise information indicating if said user equipment is in a coverage area of said second cell.

The determining means may be for determining if said user equipment is to be offloaded to said second cell in dependence on said second information from the user equipment after said second cell has been activated.

The apparatus may comprise causing means for causing an offload message to be sent to cause said user equipment to be offloaded, if said user equipment is to be offloaded.

The offload message may comprise one or more of information identifying the operator, information identifying said smaller cell, information identifying said user equipment, traffic information and signal strength information.

The causing means may be for causing a message to be sent may comprise causing said message to be sent to a spectrum controlling entity of said first network.

The first network and said second network may be provided by different network operators.

According to another aspect, there is provided an apparatus in a base station of a first cell of a first network said apparatus comprising at least one processor and at least one memory including computer code for one or more programs, the at least one memory and the computer code configured, with the at least one processor, to cause the apparatus at least to: determine that there is an inactive second cell of a second, different network which is a candidate cell for a user equipment; and cause an activation message to be sent to cause the activation of said inactive second cell.

The first cell may comprise a larger cell.

The second cell may comprise a smaller cell.

The at least one memory and the computer code may be configured, with the at least one processor, to determine from neighbour information that there is said inactive second cell.

The neighbour information may comprise previous information associated with said inactive second cell.

The neighbour information may comprise information about at least one cell of the first network and at least one cell of the second network.

The neighbour information may be provided in a neighbour relation table.

The at least one memory and the computer code may be configured, with the at least one processor, to receive first information from said user equipment.

The first information from said user equipment may comprise at least one of operator information, network information, cell identity information, received signal strength information and reference signal received power.

The activation message may comprise at least one wake up indicator, cell identity information for said second cell, and frequency information.

The at least one memory and the computer code may be configured, with the at least one processor, to receive second information from said user equipment after said inactive second cell has been activated.

The second information may comprise information indicating if said user equipment is in a coverage area of said second cell.

The at least one memory and the computer code may be configured, with the at least one processor, to determine if said user equipment is to be offloaded to said second cell in dependence on said second information from the user equipment after said second cell has been activated.

The at least one memory and the computer code may be configured, with the at least one processor, to cause an offload message to be sent to cause said user equipment to be offloaded, if said user equipment is to be offloaded.

The offload message may comprise one or more of information identifying the operator, information identifying said smaller cell, information identifying said user equipment, traffic information and signal strength information.

The at least one memory and the computer code may be configured, with the at least one processor, to cause said message to be sent to a spectrum controlling entity of said first network The first network and said second network may be provided by different network operators.

According to another aspect, there is provided a method comprising: receiving a request in a second network from a first network, said request requesting that a user equipment of said first network be offloaded to a cell of said second network; and causing a response to be provided to said request, said response being dependent on information about a resource which said first network is to provide to said second network.

According to another aspect, there is provided a method comprising: causing a request to be sent from a first network to a second network, said request requesting that a user equipment of said first network be offloaded to a cell of said second network; and receiving a response to said request, said response being dependent on information about a resource which said first network is to provide to said second network.

The following may be used in conjunction with either of the above aspects.

The receiving and said causing may be repeated.

At least one of said request and response may comprise resource information.

The resource may comprise one or more of spectrum of said first network, a financial reward, and a usage of at least a part of said first network.

The method may comprise determining candidate resource information

The resource may be dependent on or more of time of day, conditions in one or more of said first and second networks, and traffic information.

The first network and said second network may be provided by different network operators.

According to another aspect, there is provided an apparatus comprising: means for receiving a request in a second network from a first network, said request requesting that a user equipment of said first network be offloaded to a cell of said second network; and means for causing a response to be provided to said request, said response being dependent on information about a resource which said first network is to provide to said second network.

According to another aspect, there is provided an apparatus comprising: means for causing a request to be sent from a first network to a second network, said request requesting that a user equipment of said first network be offloaded to a cell of said second network; and means for receiving a response to said request, said response being dependent on information about a resource which said first network is to provide to said second network.

The following may be used in conjunction with either of the above aspects.

At least one of said request and response may comprise resource information.

The resource may comprise one or more of spectrum of said first network, a financial reward, and a usage of at least a part of said first network.

The apparatus may comprise means for determining candidate resource information

The resource may be dependent on or more of time of day, conditions in one or more of said first and second networks, and traffic information.

The first network and said second network may be provided by different network operators.

According to another aspect, there is provided an apparatus, said apparatus comprising at least one processor and at least one memory including computer code for one or more programs, the at least one memory and the computer code configured, with the at least one processor, to cause the apparatus at least to: receive a request in a second network from a first network, said request requesting that a user equipment of said first network be offloaded to a cell of said second network; and cause a response to be provided to said request, said response being dependent on information about a resource which said first network is to provide to said second network.

According to another aspect, there is provided an apparatus, said apparatus comprising at least one processor and at least one memory including computer code for one or more programs, the at least one memory and the computer code configured, with the at least one processor, to cause the apparatus at least to: cause a request to be sent from a first network to a second network, said request requesting that a user equipment of said first network be offloaded to a cell of said second network; and receive a response to said request, said response being dependent on information about a resource which said first network is to provide to said second network.

The following may be used in conjunction with either of the above aspects.

At least one of said request and response may comprise resource information.

The resource may comprise one or more of spectrum of said first network, a financial reward, and a usage of at least a part of said first network.

The at least one memory and the computer code may be configured, with the at least one processor, to determine candidate resource information The resource may be dependent on or more of time of day, conditions in one or more of said first and second networks, and traffic information.

The first network and said second network may be provided by different network operators.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Some embodiments will now be described, by way of example only, with respect to the following Figures in which.

DETAILED DESCRIPTION

In the following certain exemplifying embodiments are explained with reference to a wireless or mobile communication system serving mobile communication devices. Before explaining in detail the exemplifying embodiments, certain general principles of a wireless communication system and nodes thereof and mobile communication devices are briefly explained with reference to FIGS. 1 to 3 to assist in understanding the context of the described examples.

A non-limiting example of the recent developments in communication system architectures is the long-term evolution (LTE) of the Universal Mobile Telecommunications System (UMTS) that is being standardized by the 3rd Generation Partnership Project (3GPP). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). Some WLANs are sometimes referred to by WiFi™, a trademark that is owned by the Wi-Fi Alliance, a trade association promoting Wireless LAN technology and certifying products conforming to certain standards of interoperability.

Figure 1:
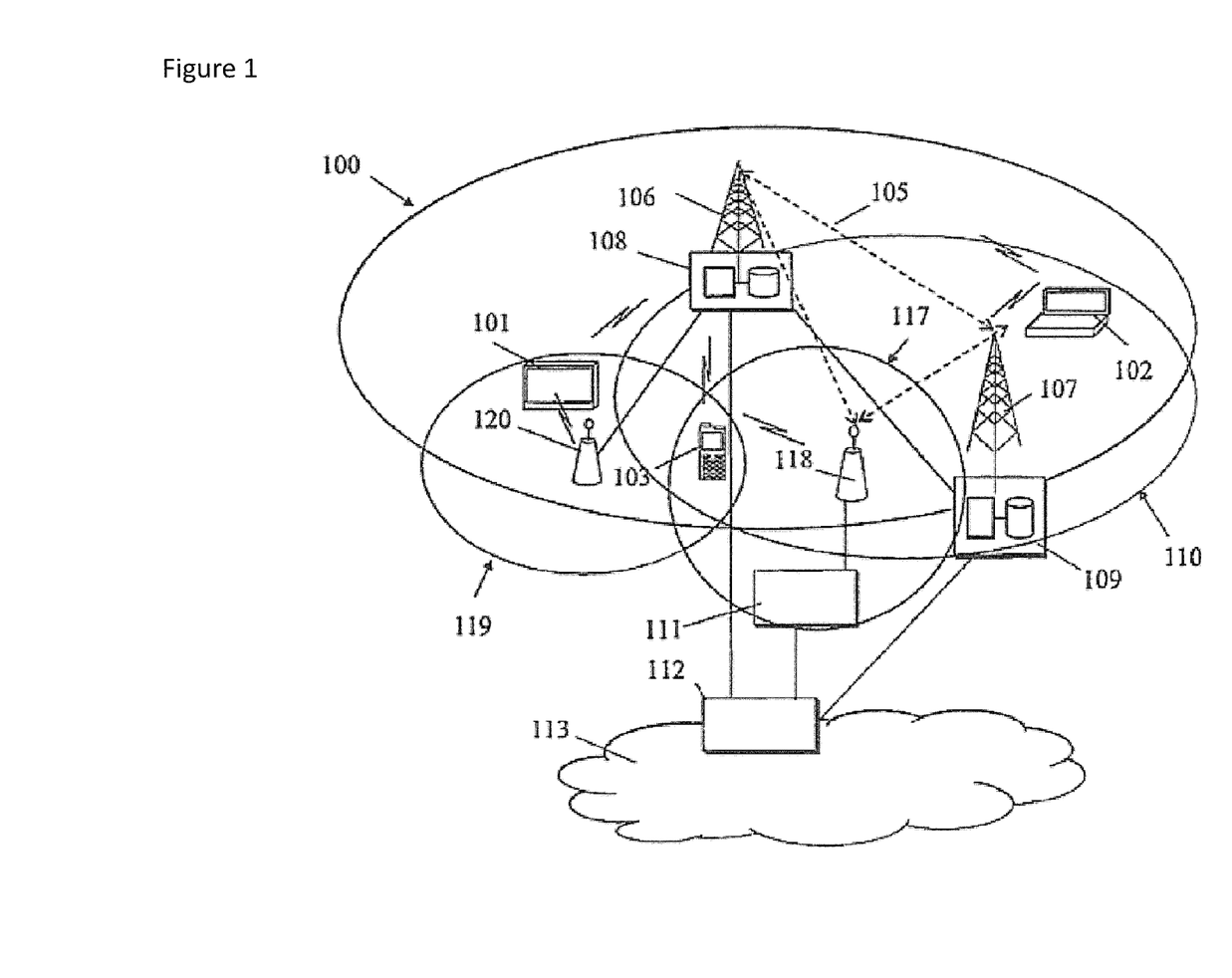
FIG. 1 shows a schematic diagram of a network according to some embodiments.

Different types of communication devices 101, 102, 103 can be provided wireless access via base stations or similar wireless transmitter and/or receiver nodes providing radio service areas or cells. In FIG. 1 different neighbouring and/or overlapping radio service areas or cells 100, 110, 117 and 119 are shown being provided by base stations 106, 107, 118 and 120. It is noted that the cell borders are schematically shown for illustration purposes only in FIG. 1. It shall be understood that the sizes and shapes of the cells or other radio service areas may vary considerably from the omni-directional shapes of FIG. 1. A base station site can provide one or more cells or sectors, each sector providing a cell or a subarea of a cell. Each communication device and base station may have one or more radio channels open at the same time and may send signals to and/or receive signals from more than one source.

Figure 3:
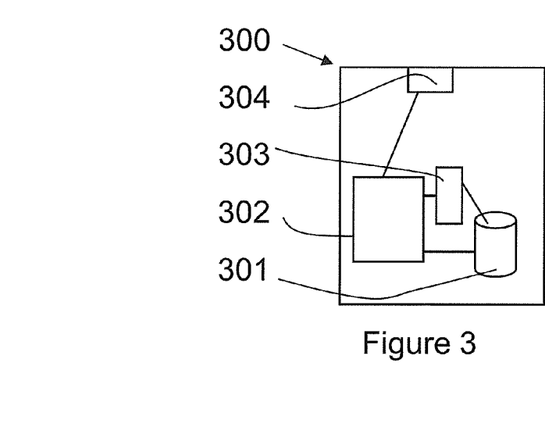
FIG. 3 shows a schematic diagram of a control apparatus according to some embodiments.

Base stations are typically controlled by at least one appropriate controller apparatus 108, 109 (for example as shown in FIG. 3) so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. In some embodiments the control apparatus may be respectively provided in each base station.

Different types of possible cells include those known as macro cells, pico cells and femto cells. For example, transmission/reception points or base stations can comprise wide area network nodes such as a macro eNode B (eNB) which may, for example, provide coverage for an entire cell or similar radio service area. A base station can also be provided by small or local radio service area network node, for example Home eNBs (HeNB), pico eNodeBs (pico-eNB), or femto nodes. Some applications utilise radio remote heads (RRH) that are connected to for example an eNB. As cells can overlap a communication device in an area can listen and transmit to more than one base station. Smaller radio service areas can be located entirely or at least partially within a larger radio service area. A communication device may thus communicate with more than one cell.

In a particular example, FIG. 1 depicts a larger cell 100. In this example the larger cell 100 can be provided by a wide area base station 106 provided by a macro-eNB. The larger cell may be a macro cell. The macro-eNB 106 transmits and receives data over the entire coverage of the cell 100. A smaller cell 110 in this example is a pico-cell. A smaller cell can also be provided by another suitable small area network node 118 such as Home eNBs (HeNB) (femto cell) or another pico eNodeBs (pico-eNB). A yet further cell 119 is shown to be provided by a remote radio head (RRH) 120 connected to the base station apparatus of cell 100. These smaller cells may be referred to as small cells in the document.

Base stations may communicate via each other via fixed line connection and/or air interface. The logical connection between the base station nodes can be provided for example by an X2 interface. In FIG. 1 this interface is shown by the dashed line denoted by 105.

The base stations may communicate via one or more entities 111 and 112 with a core network 113. These one or more entities and/or one or more entities in the core network may have a spectrum control function.

One or more entities may provide a spectrum control function solely or in addition to one or more other functions. A spectrum controller may be responsible for controlling the shared spectrum resources in the inter-operator situations.

The spectrum controller may be part of the O&M (operation and maintenance) system and/or part may be distributed within a network (e.g. in a base station). This may depend on how dynamic the spectrum control is. For example at a higher network level shared spectrum bands are determined with constraints (for example location, time, and/or power) and at a lower level the decisions could be made how to use the shared resources based on the local conditions. The lower level can be in a base station or a radio network controller. The higher level can be in the core network.

Figure 2:
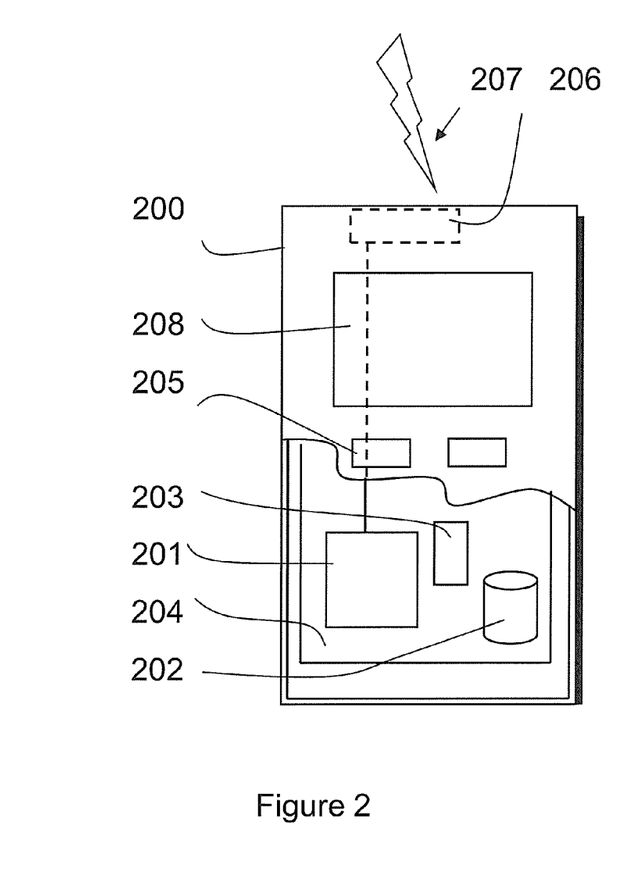
FIG. 2 shows a schematic diagram of a mobile communication device according to some embodiments.

A possible mobile communication device for transmitting to and receiving from a plurality of base stations will now be described in more detail with reference to FIG. 2 showing a schematic, partially sectioned view of a mobile communication device 200. Such a device is often referred to as user equipment (UE) or terminal. An appropriate mobile communication device or user equipment may be provided by any device capable of sending radio signals to and/or receiving radio signals from multiple cells. Non-limiting examples include a mobile station (MS) such as a mobile phone or what is known as a 'smart phone', a portable computer provided with a wireless interface card, and USB stick or 'dongle' with radio, or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. It should be appreciated that in some embodiments, the user equipment may be provided at a generally fixed location. The mobile device may receive and transmit signals over an air interface 207 with one, two or more base stations via an appropriate transceiver apparatus. In FIG. 2 transceiver apparatus is designated schematically by block 206. The transceiver apparatus 206 may be provided for example by means of a radio part and associated antenna arrangement. The radio part is arranged to communicate simultaneously with different stations. The radio part may also be arranged to communicate via different radio technologies. For example, the radio part can provide a plurality of different radios. The antenna arrangement may be arranged internally or externally to the mobile device.

A mobile communication device is also provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as key pad 205, voice commands, touch sensitive screen or pad, combinations thereof or the like. A display 208, a speaker and a microphone can also be provided. Furthermore, a mobile communication device may comprise appropriate connectors (either wired or wireless) to other devices and/or for connecting external accessories, for example hands-free equipment, thereto.

FIG. 3 shows an example of a control apparatus for a communication system. In some embodiments a base station can comprise a control apparatus such as shown in FIG. 3. This control apparatus may be provided in a spectrum control entity 33. The control apparatus 300 can be configured to provide control functions by means of the data processing facility in accordance with certain embodiments described below. For this purpose the control apparatus comprises at least one memory 301, at least one data processing unit 302, 303 and an input/output interface 304. Via the interface the control apparatus can be coupled to a receiver and a transmitter of the base station where the apparatus is provided in the base station. The control apparatus can be configured to execute an appropriate software code to provide the control functions.

Some embodiments relates to mobile wireless communication systems, such as 3GPP Long-Term Evolution Advanced (LTE-A).

Some embodiments may provide inter-operator spectrum sharing to facilitate Flexible Spectrum Utilization (FSU).

As discussed above a small cell can be deployed with the macro cell layer. Offloading of a UE, which is attached to a macro cell, to a small cell may improve the spectrum efficiency, enlarge the coverage and/or save the energy of a UE. The shortage of spectrum makes small cell FSU a useful tool. On the one hand, with increasing of small cell deployment density, the available spectrum may be scarce. On the other hand, if a fixed part of the spectrum is used by only one operator, some spectrum will be wasted when there is no traffic. Inter-operator spectrum sharing may be one way of improving the spectrum efficiency, for example for small cells.

In some embodiments, it may be useful to ensure that where possible, a UE is served by a small cell as far as possible. However, in some cases, there may be no suitable intra-operator small cell to serve a UE. In this situation, some embodiments may find an inter-operator small cell (i.e. a cell belonging to a different operator) and make this cell serve the UE. There may be some reward for the different operator. In some embodiments, the operators may be competitors and each operator may want to maximize their own interest. In some embodiments, reward strategies may be considered in the inter-operator offloading mechanism. This may improve the utilization rate of the vacant spectrum.

Figure 4:
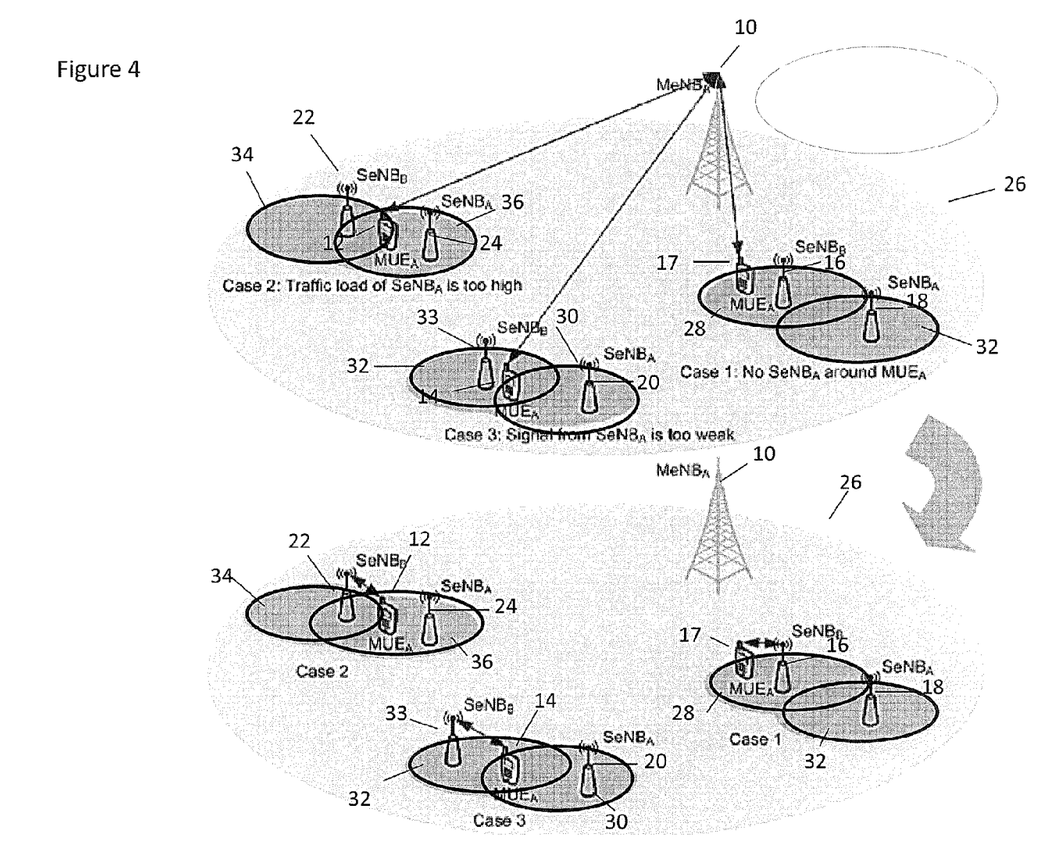
FIG. 4 shows examples of inter-operator service scenarios.

By way of example only and with reference to FIG. 4, some examples of some possible cases where a UE associated with a macro cell can be served by an inter-operator small cell.

FIG. 4 shows a scenario where three examples, case 1, case 2 and case 3 where user equipment is initially communicating with the macro cell base station 10. FIG. 4 also shows the situation subsequently where the user equipment is associated with a small cell.

In the system shown in FIG. 4, a macro cell 26 is served by the base station 10 which is associated with a first operator.

In the first case, a first small cell 32 is shown which is associated with the first operator whilst a second small cell 28 is associated with a second operator. Cell 32 is served by a small cell base station 18 of the first operator whilst the cell 28 is served by base station 16 of the second operator. In the situation of the first case, the user equipment 17 is in a small cell of the second network operator but not a small cell belonging to the first network operator. In the situation of case 1, the user equipment 17 is attached to the base station 16 of the second operator. However, the respective cell of the second operator may have to be woken up or activated.

In the example of case 2, a user equipment 12 is again in communication with the macro cell base station 10. The user equipment 12 is in an area of overlap between a small cell 36 of the first operator and a small cell 34 of the second operator. The cell 36 of the first operator is served by a small cell base station 24 whilst the cell 34 is served by the small cell base station 22 of the second operator. In this scenario of case 2, the traffic load of the base station 24 associated with the first operator is too high to serve the user equipment and there are no other small cells of the first operator around the user equipment 12. However, there is a small cell 34 of the second operator which can provide service to the user equipment. Accordingly, in this example, the user equipment is then served by the small cell base station 22 of the second operator. The cell of the second operator may be sleeping or inactive and may need to be activated in order for the user equipment to communicate with the base station of that small cell.

Reference is now made to the third scenario. In this case, the user equipment 14 is again arranged in a region of overlap of a small cell 30 which is served by a base station 20 of the first operator and a small cell 32 which is served by a base station 33 of the second operator. In the third case, for some reason, the user equipment is not properly served by the base station 20 of the first operator. This may be if the user equipment is at the edge of the small cell or if there are obstacles between the user equipment and the small cell such that the received signal is too low to serve this user equipment. Again, there is no other small cell of the first operator around the user equipment. However, this user equipment is also in the small cell of the second operator. Again, in this example, the cell 32 may be sleeping or inactive and may be made active or woken up such that the cell 32 of the second operator can serve the user equipment.

In the above examples, the small cell of the second operator may be active or inactive or sleeping. If the small cell is inactive or sleeping, that cell will need to be activated. For simplicity, two small cells are shown for each case but in some embodiments, the situation may be more complex and have more than two cells in each scenario.

Spectrum sharing has been proposed to exploit spectrum efficiency in future communication system. Typically proposals focus on intra-operator systems. There may be a primary system and one or more secondary systems in the spectrum sharing system model. In this situation, when a frequency is needed by the primary system, the secondary system may concede.

In some situations such as co-primary inter-operator spectrum sharing, all the operators may have equal rights for the co-shared spectrum.

Offloading of users from a macro cell layer to a small cell layer where the macro layer and small cell layer are on different carrier frequencies is one deployment scenario. As an energy efficient method, a sleeping mechanism may have some advantages although the small cell discovery process may be more complex.

Some embodiments may provide an inter-operator service mechanism. This may allow the spectrum be used more efficiently. Some embodiments may provide an inter-operator small cell wake up mechanism and/or a negotiation process.

Some embodiments may provide sleeping inter-operator small cell discovery methods. A sleeping inter-operator small cell discovery method of some embodiments may use the historical information of neighbour relationship. In some embodiments a neighbour relation table will also include the neighbours of inter-operators as well as intra-operator cells. In some embodiments, a separate table may be provided for inter-operator cells and a separate table for intra-operator cells. A small cell of a second operator once active will be stored in the neighbour table of a small cell of a first operator, assuming the two cells are neighbours. In some embodiments this will be stored in a table such as a neighbour relation table (NRT).

In one example a UE is in the small cell of a first operator and that UE has stored the historical information of neighbour relationship, including information about neighbouring cells of a second operator. The UE then may use the historical neighbour relation table of the small cell of the first operator to discover the small cell of the second operator.

When the UE of the first operator tries to access the small cell of the second operator and that cell of the second operator is sleeping, the first operator may send an inter-operator wake up indication message to the second operator. The first operator informs or requests the second operator to wake up the small cell of the second operator. The first operator may provide the second operator with a carrier frequency $f_0$ which is to be used by the small cell of the second operator. This inter-operator wake up indication message may comprise one or more of the following parameters:

A wake up indicator which indicates that the target sleeping small cell should wake up.

The target cell ID that indicates which small cell is to be activated be activated.

A carrier frequency $f_0$ which is provided by operator A to the target cell ID.

Once a RSRP (Received signal received power) is higher than a threshold, the first operator may attempt to offload its UE (which may be attached to a macro cell of the first operator or to a small cell of the first operator which is perhaps unable to service the UE adequately) to the small cell of operator B.

The first operator may send an inter-operator service message to its service management entity which may comprise one or more of the following parameters:

An operator flag that indicates the operator to which the target small cell belongs.

The target cell ID that indicates the small cell to which the UE will be offloaded.

RSRP from the target cell to the UE.

International Mobile Station Identify (IMSI) of the UE.

Traffic type and/or QoS (quality of service) such as FTP, VoIP (voice over internet protocol), video, etc.

Any suitable negation process may be used in embodiments. In a first example, when the service management entity of the first operator has received the inter-operator service message, it may send an inter-operator offloading request message to a corresponding entity or any other suitable entity of the second operator. This inter-operator service request message may comprise one or more of the following parameters:

The target cell ID of the small cell to which the UE is to be offloaded.

The IMSI of the UE.

RSRP from the target cell to UE.

Traffic type and/or QoS (quality of service) such as FTP (file transfer protocol), VoIP (voice over internet protocol), video, or the like.

Once the second operator has received the inter-operator service request message from the first operator, the second operator will calculate the needed resource based on the message. The second operator may send an inter-operator reward request message to the first operator. This may comprise information about the reward for the second operator and may be dependent on the required resource. The inter-operator reward request message may comprise:

The reward for second operator claimed by the second operator. The reward may be one or more of spectrum, real currency, and any other suitable resource. Other reward options may comprise a predefined value of the exchanged spectrum or other resources, and/or usage of the other operator network structure. The predefined value may be negotiated beforehand with operators. In some embodiments there may be a predefined abstraction or mapping of the value to the exchanged resources.

In another example, when the service management entity of first operator has received the inter-operator service message, the service management entity may send an inter-operator service request message to a corresponding entity of the second operator. This inter-operator service request message may comprise one or more of the following parameters:

The target cell ID of the small cell to which the UE is to be offloaded.

IMSI of the UE.

RSRP from the target cell to the UE.

Traffic type and/or QoS (quality of service) such as FTP, VoIP (voice over internet protocol), video, etc.

The reward for the second operator which is offered by the first operator. The reward for second operator claimed by the second operator. The reward may be one or more of the previously described options.

Figure 5:
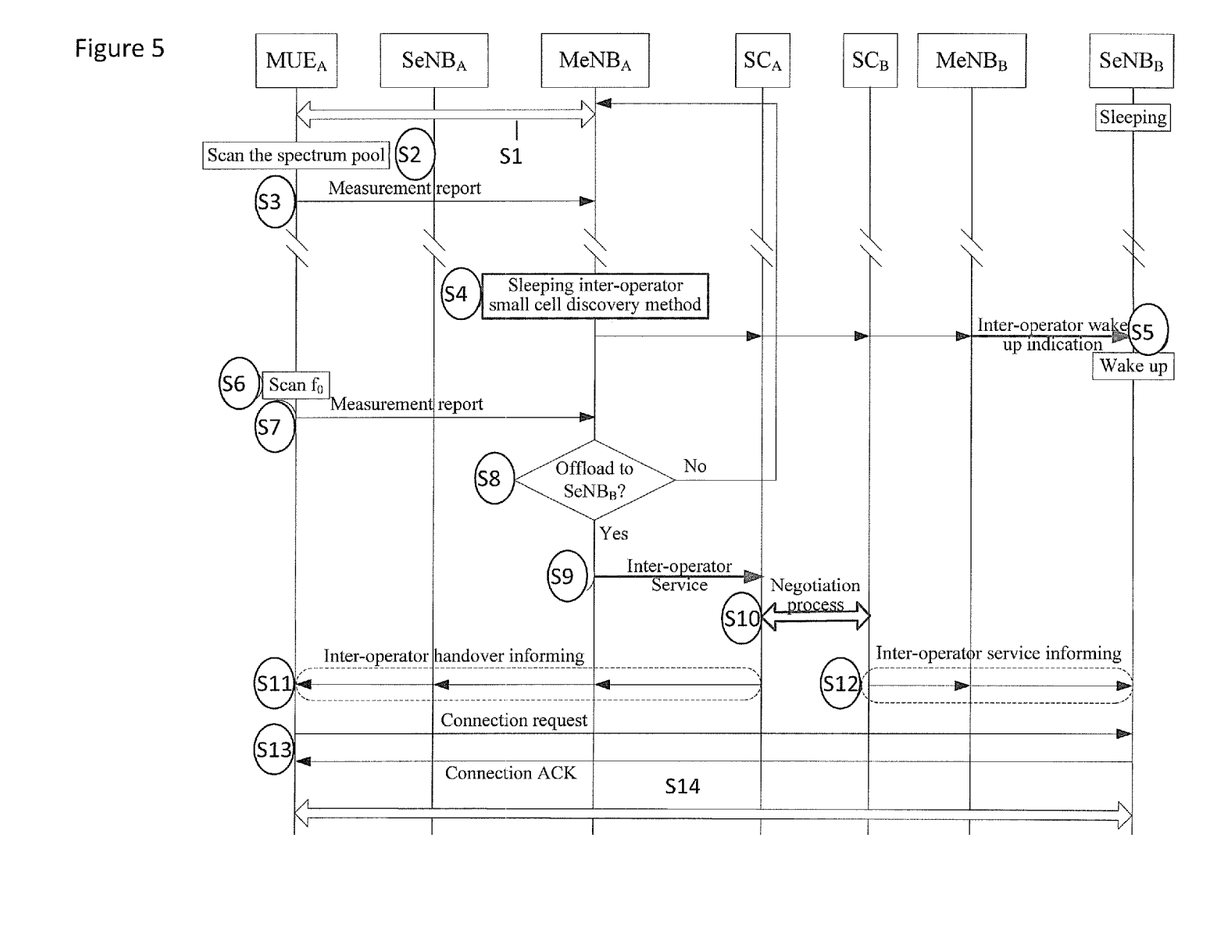
FIG. 5 shows a signal flow of offloading between two operators.

FIG. 5 shows one example of signaling which may be used in some embodiments. In the example shown in FIG. 5 only one small cell for each of two operators is shown for convenience of description. In some embodiments, there may more than two small cells associated with the operators.

As shown in step S1, the UE ($UE_A$) is communicating with its macro cell ($MeNB_A$) of the first operator.

The UE may be in an area covered by one or more small cells. The small cells may be of its own operator and/or a second different operator.

In step S2, the UE will scan the spectrum pool. The small cells of different operators may exchange neighbour list tables between each other so each small cell base station will know the neighbours of its own network and also neighbours of the other operator's network. Based on the neighbour list information, the UE may scan the component carriers of the spectrum pool and determine the missing neighbour which should be there.

In step S3, the UE reports the measurement result to its macro cell base station $MeNB_A$. The measurement report may comprise one or more of: an OP (operator) flag, cell ID and RSRP.

In one example, there is no small cell of the first operator suitable for the UE and there is no active small cell of the second operator suitable for the UE. In step S4, the base station $MeNB_A$ determines if there are any sleeping small cells $SeNB_B$ of the second operator. The base station will use the neighbor history information.

In step S5, the macro cell base station $MeNB_A$ of the first operator causes a wake up indication message to be sent to the sleeping small cell $SeNB_B$ of the second operator. This message may be sent via a spectrum control (SC) entity of the first operator, a spectrum control entity of the second operator and a macro cell base station $MeNB_B$ associated with the sleeping small cell of the second network operator. This will wake up or activate the sleeping small cell of the second operator. The wake up indication message may comprise one or more of a wake up indicator, target cell ID, and working frequency.

In step S6, the UE scans the frequency $f_0$ to determine if the UE is in coverage area of the small cell of the second operator.

In step S7, the UE reports the measurement result to macro cell base station $MeNB_A$ of the first operator.

In step S8, the macro cell base station $MeNB_A$ of the first operator determines if it is necessary to offload this UE to the small cell of second operator B. If it is determined that the UE is to be offloaded to the small cell of the second operator, the next step is step S9. Otherwise, the UE $MUE_A$ will continue to communicate with macro cell base station $MeNB_A$ of the first operator (S1). In some embodiments, only when there is a small cell of the second operator and the RSRP is higher than a threshold, will the offload will be triggered. Of course any other suitable mechanism may alternatively or additionally be used to determine if a UE is be offloaded to a small cell base station of a different operator.

In step S9, the macro cell base station of the macro cell base station $MeNB_A$ sends an inter-operator service message to the spectrum control entity of the first operator. This message may be an offloading message. The offloading message may comprise one or more of an operator flag identifying the operator, target cell ID, RSRP, IMSI, and traffic type.

In step S10, there is a negotiation process between the spectrum control entity of the first operator and the spectrum control entity of the second operator. This will be discussed in more detail later.

In step S11, the spectrum control entity $SC_A$ of the first operator causes a message to be sent to the UE via the macro cell of the first base station and the base station of the first cell $SeNB_A$ that the UE will be handed over to small cell $SeNB_B$ of the second operator. This may indicate that the small cell base station of the first operator needs to make some preparation for the handoff. This assumes in this example that UE is in communication with the small cell of the first operator. In some embodiments, the message may be provided directly by the macro cell base station The inter-operator handover informing message may comprise one or more of the target cell ID of small cell $SeNB_B$ of the second operator and the working frequency.

In step S12, the spectrum control entity of the second operator causes a message to be sent to the small cell of the second operator via the macro cell base station of the second operator associated with the small cell. This message advises the small cell base station that the UE will access that cell. That cell will prepare for the offload of that UE to that small cell of the second operator. The inter-operator service informing message may comprise one or more of the IMSI of UE and the working frequency.

It should be appreciated that steps S11 and S12 can take place in either order or at the same time.

In step S13, the UE sends a connection request to the small cell base station of the second operator. That base station will send an acknowledgement to the UE.

In step S14, the UE is attached to the small cell base station of the second operator.

Two different negotiation processes between two operators will now be described.

Figure 6:
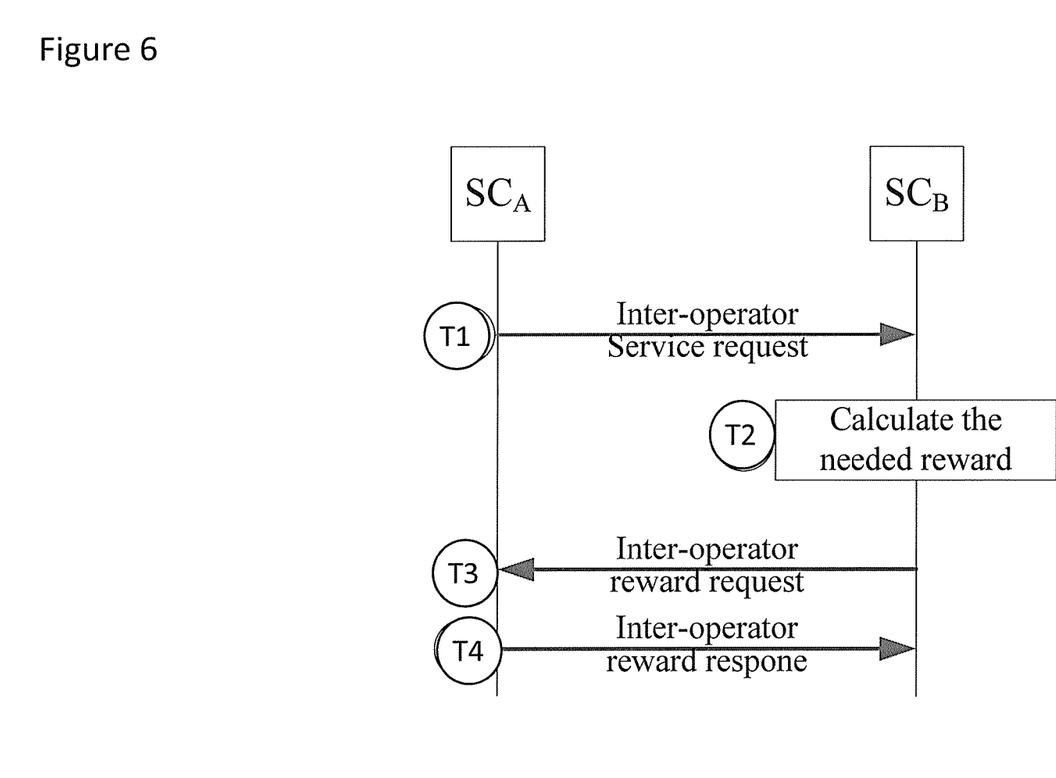
FIG. 6 shows an alternative negotiation process.

Reference is made to FIG. 6 which shows a first flow.

In step T1, the spectrum controller of the first operator sends an inter-operator service request to the spectrum controller of the second operator. This message may comprise one or more of the target cell ID, IMSI, RSRP, and traffic type.

In step T2, the spectrum controller of the second operator calculates the reward. The reward may be calculated or determined in any suitable way. For example, the reward may be determined according to one or both of the RSRP and the user's traffic type. For example, assume the RSRP is P and the data rate restriction for the traffic type is not lower than $R_0$. If the reward is spectrum, then the required reward spectrum may be $R_0/\log_2(1+P/N_0)$ according to the Shannon formulation. It should be appreciated that the reward can take any suitable form and the reward may be calculated using any suitable method.

In step T3, the spectrum controller of the second operator sends an inter-operator reward request message to spectrum controller of the first operator. The spectrum reward desired may be indicated in the inter-operator request message. Alternatively, in some embodiments, the request may indicate merely that a reward is required. If the reward is spectrum, the spectrum $SC_B$ required by the second operator from the first operator may be the same or higher than the needed spectrum for UE. The second operator can use the spectrum to serve its own users as well as the UE of the first operator.

In step T4, the spectrum controller of the first operator sends an inter-operator reward response message to the spectrum controller of the second operator.

This step and step T3 may repeat until the two operators agree with the reward, in some embodiments. In other embodiments the two operators may have already agreed a suitable reward. The reward may be dependent on the conditions of one or other of the networks.

Figure 7:
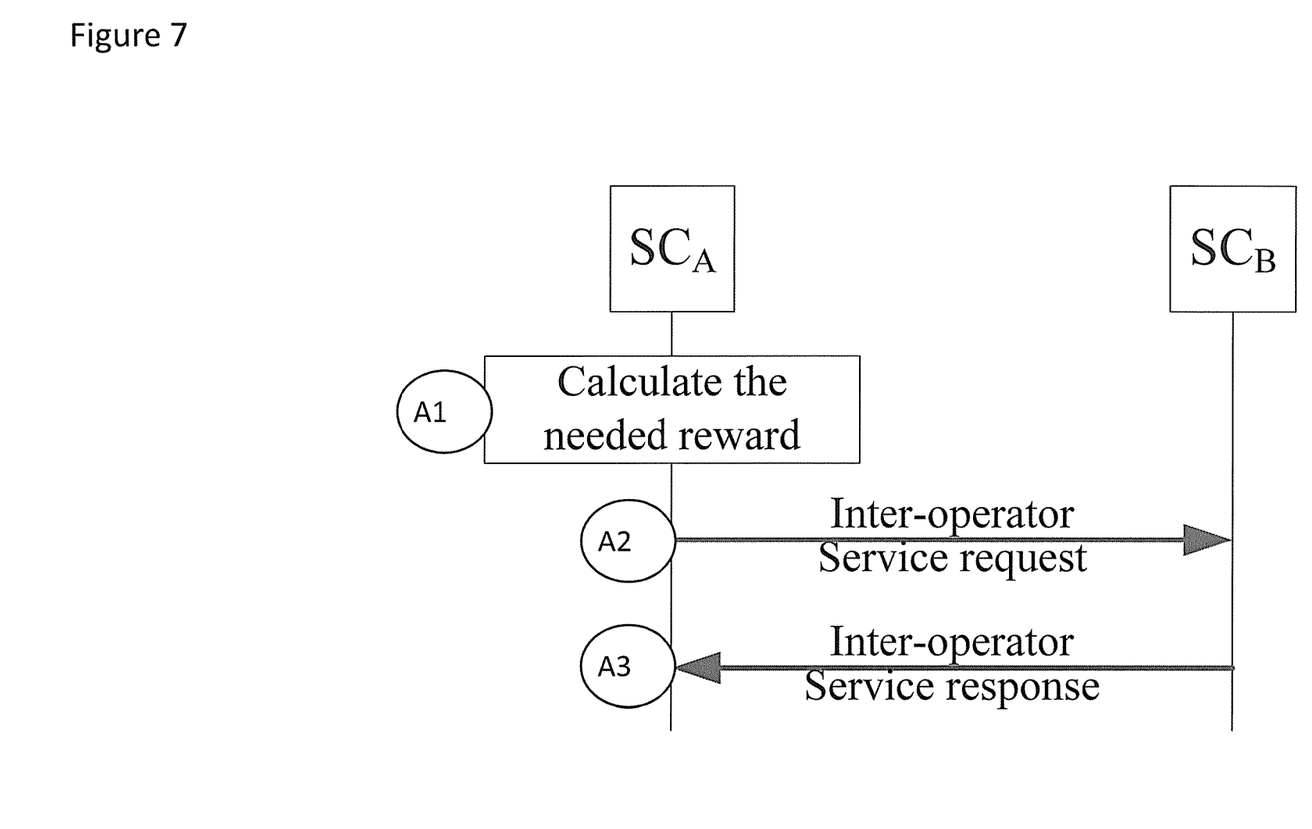
FIG. 7 shows a second alternative negotiation process.

Reference is made to FIG. 7 which shows an alternative negotiation process of some embodiments.

In step A1, the spectrum controller of the first operator calculates or determines the reward in any suitable way such as described in relation to the previous embodiment. For example the reward may be determined in dependence on one or more of the RSRP and the traffic type of the user equipment.

In step A2, the spectrum controller of first operator sends an inter-operator service request message to the spectrum controller of the second operator. This message may comprise one or more of the target cell ID, IMSI, RSRP, traffic type, and the reward.

In step A3, the spectrum controller of the second operator sends an inter-operator service response message to spectrum controller A.

This step and step A1 may repeat until the two operators agree a reward.

For different cases, the reward strategy may be different. Some examples will now be discussed in relation to the scenarios shows in FIG. 4.

For case 1, there is no small cell belonging to the first operator around the UE. The first operator may provide to the second operator some spectrum from one or more small cells away from the UE as the reward.

For case 2, the traffic load of the base station of the small cell of the first operator is high. The spectrum is thus constrained, so the first operator may take some spectrum from one or more other small cells away from the UE to provide as a reward to the second operator.

For case 3, the traffic load of the small cell $SeNB_A$ of the first operator may be low, and the first operator will provide some spectrum of the small cell $SeNB_A$ of the first operator as the reward to operator B.

The rewards may be dependent on the traffic load on the networks. For example, at a busy time, the second operator will agree to serve the UE in return for a higher reward. However, at a less busy time, the second operator will provide a lower reward to the second operator In some embodiments, the reward may be dependent on the type of traffic and/or the QoS.

In some embodiments, each operator may have one or more thresholds which may be dependent on one or more conditions. Those conditions may comprise one or more of network load, cell load, traffic type, traffic volume, quality of service and/or any other suitable condition. One or more thresholds may be used to determine whether an operator is to provide spectrum to another operator. One or more thresholds may be used to determine if a network operator is willing to provide the requested reward.

It should be appreciated that in some embodiments, allocation of spectrum and/or other reward may be agreed by the operators in advance. The reward may be determined by taking into account one or more conditions such as time of day, type of traffic, load or the like.

The above embodiments have used spectrum as a reward. It should be appreciated that the reward may alternatively or additionally take any other suitable form. The type of reward provided may be dependent on one or more conditions. These conditions may be as discussed above.

Some embodiments may have one or more of the following advantages:

The negotiation process may result in a better use of the spectrum e.

A UE may be served with small cells as far as possible.

Some embodiments may improve the probability of a UE accessing small cells, and this may be energy efficient from the UE aspect. This is because the UE can use lower power transmissions.

Even if there is no serving cell for a UE available from its own operator, a different operator may be able to provide a cell for this UE. This may improve the user experience.

In the above reference is made to small cells. It should be appreciated that other embodiments may alternatively or additionally be used with other sizes of cell.

Some communications have been described as being via macro cells. It should be appreciated that in other embodiments, different communication paths may be provided to for example activate a sleeping cell.

In the above reference is made to inter operator situations. It should be appreciated that in other embodiments, there may be two separate networks. Those networks may be operated by the same operator.

A small cell is generally a cell which is smaller than for example a larger cell. The larger cell may be a macro cell. The smaller cell may be a pico cell, a femto cell, a home NB cell and/or any other suitable smaller cell.

An appropriately adapted computer program code product or products may be used for implementing the embodiments, when loaded on an appropriate data processing apparatus, for example for control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

What is claimed is:

1. A method comprising:
   determining at a base station of a first cell of a first network that there is a second cell of a second different network which is a candidate cell for a user equipment, wherein said second cell is in a sleep mode and is inactive, wherein at least one of said first cell comprises a larger cell and said second cell comprises a smaller cell, and wherein the first cell and the second cell have different network operators;
   communicating, by the base station, a request to an operator of the second different network to offload the user equipment to the second cell, wherein the request is followed by a negotiation with an apparatus associated with the operator of the second different network of a resource to provide the second different network for offloading of the user equipment to the second cell; and
   based on the negotiating, causing information comprising an inter-operator wake up indication message to be sent to the operator of the second different network to cause said second cell to wake up from the sleep mode and become active for the offloading the user equipment to the second cell, wherein the information comprises a carrier frequency to be used by the second cell for the offloading.

2. The method as claimed in claim 1, wherein the determining the second cell is the candidate cell for the user equipment is based on receiving first information from said user equipment, wherein said first information from said user equipment comprises at least one of operator information, network information, cell identity information, received signal strength information and reference signal received power.

3. The method as claimed in claim 1, wherein said information comprises cell identity information for said second cell.

4. The method as claimed in claim 1, comprising receiving second information from said user equipment after said sleeping and inactive second cell has been woken and activated, wherein said second information comprises information indicating that said user equipment is in a coverage area of said second cell.

5. The method as claimed in claim 4, comprising offloading said user equipment to said second cell in dependence on said second information from the user equipment after said second cell has be woken and activated.

6. The method as claimed in claim 5, comprising causing an offload message to be sent to said second different network to cause said user equipment to be offloaded.

7. The method as claimed in claim 6, wherein said offload message comprises one or more of information identifying an operator of the second cell, information identifying said second cell, information identifying said user equipment, traffic information, and signal strength information.

8. The method as claimed in claim 1, wherein said resource comprises a financial reward.

9. The method as claimed in claim 1, wherein the determining the candidate cell for the user equipment is using a historical neighbour relation table.

10. An apparatus comprising:
    at least one processor and at least one memory including computer code for one or more programs, the at least one memory and the computer code configured, with the at least one processor, to cause the apparatus at least to:

determine, at a base station of a first cell of a first network, that there is a second cell of a second different network which is a candidate cell for a user equipment, wherein said second cell is in a sleep mode and is inactive, and wherein the first cell and the second cell have different network operators;

communicate a request to an operator of the second different network to offload the user equipment to the second cell, wherein the request is followed by a negotiation with the second different network of a resource to provide the second different network for offloading of the user equipment to the second cell; and based on the negotiating, cause information comprising an inter-operator wake up indication message to be sent to the operator of the second different network to cause the second cell to wake up from the sleep mode and become active for the offloading of the user equipment to the second cell, wherein the information comprises a carrier frequency to be used by the second cell for the offloading.

11. The apparatus as claimed in claim 10, wherein the determining the second cell is the candidate cell for the user equipment is based on first information from said user equipment, wherein said first information from said user equipment comprises at least one of operator information, network information, cell identity information, received signal strength information and reference signal received power.

12. The apparatus as claimed in claim 10, wherein the at least one memory and the computer code are configured, with the at least one processor, to cause the apparatus to:

receive second information from said user equipment after said sleeping and inactive second cell has been woken and activated.

13. The apparatus as claimed in claim 12, wherein the second information comprises information indicating that said user equipment is in a coverage area of said second cell.

14. The apparatus as claimed in claim 10, wherein the information comprises cell identity information for said second cell.

15. The apparatus as claimed in claim 10, wherein the at least one memory and the computer code are configured, with the at least one processor, to cause an offload message to be sent to cause said user equipment to be offloaded.

16. The apparatus as claimed in claim 15, wherein the offload message comprises one or more of information identifying the operator, information identifying said second cell, information identifying said user equipment, traffic information and signal strength information.

17. An apparatus comprising at least one processor and at least one memory including computer code for one or more programs, the at least one memory and the computer code configured, with the at least one processor, to cause the apparatus at least to:

receive a request in a second network from a first network, said request requesting that a user equipment of said first network be offloaded to a cell of said second network, wherein said cell is in a sleep mode and is inactive, and wherein the first cell and the second cell have different network operators;

based on the request, negotiate with the first network a resource to be provided by the first network for offloading of the user equipment to the cell of the second network;

cause a response to be provided to said first network based on the negotiated resource which said first network is to provide to said second network; and based on said response, receive information comprising an inter-operator wake up indication message to wake up said cell of said second network from the sleep mode and become active for the offloading of the user equipment to the cell of the second network, wherein the information comprises a carrier frequency to be used by the second cell for the offloading.

18. The apparatus as claimed in claim 17, wherein said at least one of said request and response comprises information of said resource.

19. The apparatus as claimed in claim 17, wherein said resource comprises one or more of spectrum of said first network, a financial reward, and an usage of at least a part of said first network.

20. The apparatus as claimed in claim 17, wherein the at least one memory and the computer code are configured, with the at least one processor, to determine candidate resource information in the response to be transmitted to the first network.

21. The apparatus as claimed in claim 17, wherein said resource is dependent on or more of a time of day, conditions in on one or more of said first network, and traffic information.

* * * * *

UNITED STATES PATENT AND TRADEMARK OFFICE
CERTIFICATE OF CORRECTION

PATENT NO. : 9,826,476 B2
APPLICATION NO. : 15/103018
DATED : November 21, 2017
INVENTOR(S) : Teng et al.

It is certified that error appears in the above-identified patent and that said Letters Patent is hereby corrected as shown below:

In the Claims

Claim 21, Column 18, Line 42 --one-- should be inserted in between "on" and "or".

Claim 21, Column 18, Line 43 "on" should be deleted in between "in" and "one".

Signed and Sealed this
Twenty-fourth Day of April, 2018

Andrei Iancu
*Director of the United States Patent and Trademark Office*